Feb. 5, 1946.   H. GRIESBECK   2,394,303
MANUFACTURE AND BOTTLING OF CARBONATED MILK BEVERAGES
Filed Feb. 27, 1940   2 Sheets-Sheet 1

Inventor:

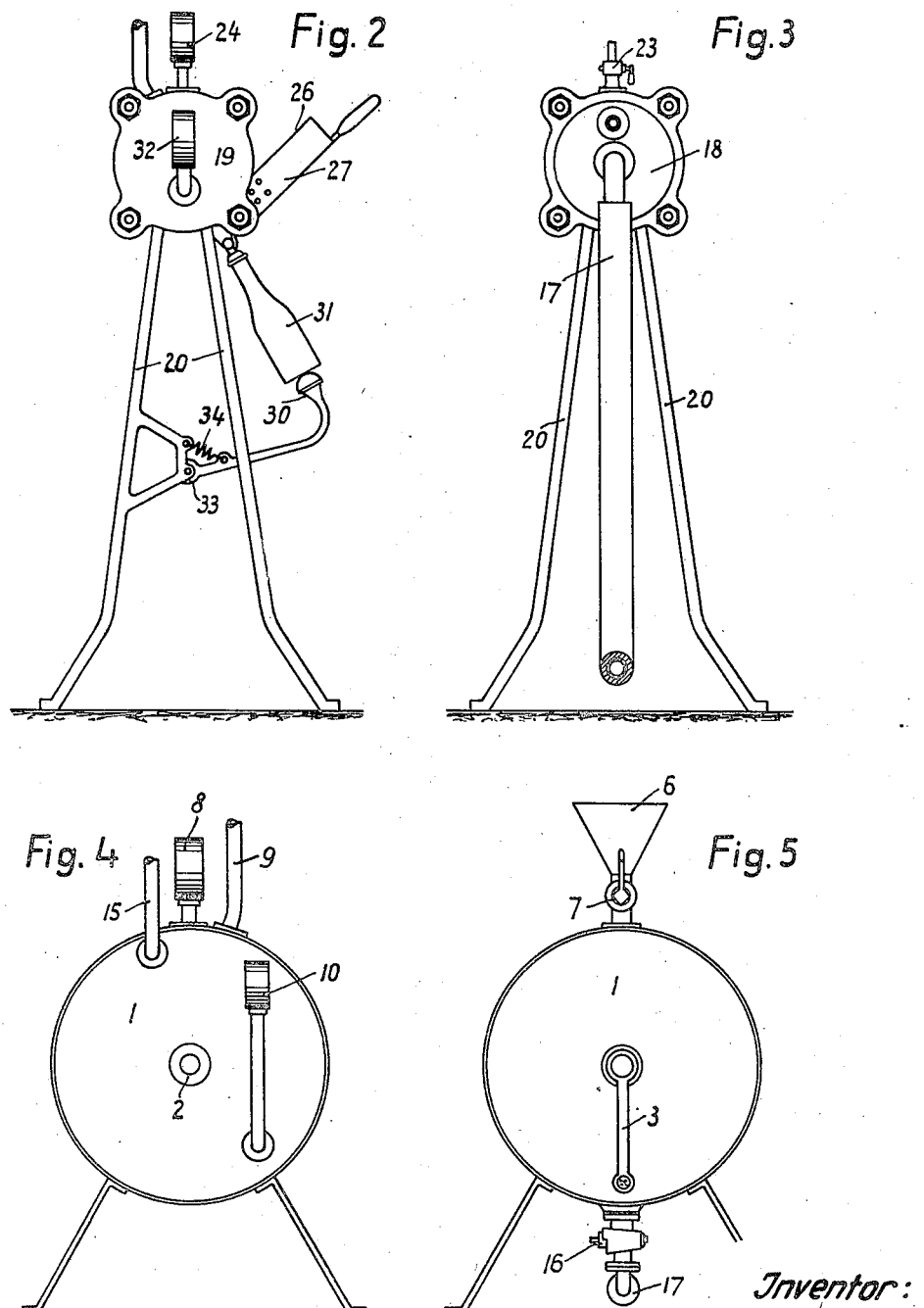

Patented Feb. 5, 1946

2,394,303

UNITED STATES PATENT OFFICE 2,394,303

MANUFACTURE AND BOTTLING OF CARBONATED MILK BEVERAGES

Hans Griesbeck, Cologne, Rhine, Germany; vested in the Alien Property Custodian

Application February 27, 1940, Serial No. 321,084
In Germany April 22, 1938

1 Claim. (Cl. 99—79)

In the preparation of milk beverages containing carbonic acid it is known to treat the milk with carbonic acid at about 2 atm. pressure. It is also known to treat milk with carbonic acid in the cold. In drawing off the carbonic acid beverage under counter-pressure into bottles or similar closable retailing vessels the extremely disturbing disadvantage is found that the beverage, even if it has been previously sterilised (pasteurised) and homogenised at pressures up to 150 atm., can only be so far slowly compressed into the retailing vessel at the hitherto usual draw-off temperature of about 4 degrees centigrade above zero, in spite of the use of counter-pressure, to such an extent that it fills the volume of the retailing vessel completely but without subsequent settling down. Its power of frothing is so great and its volume so expanded by the large quantity of very fine gas spaces in the bubbles that it frequently requires a rest of many hours in order to attain a settling down of this volume into the purely liquid condition whereby there arises a gas space above the liquid surface which on opening and suddenly releasing has resulted in a turbulent gushing forth and spurting out of the thus suddenly released layer of liquid by which the coverings and objects in the vicinity, as well as the persons opening the flask are frequently soiled. Also the stability and keeping power of the contents of such a container which is only partly filled with beverage and the other part with gas, is greatly reduced.

The previously described disadvantages may be avoided according to the invention if the cooling procedure is carried out in two stages at different times with a rest interval in between and at two different cooling temperatures.

According to the invention therefore, in the above manner the previously sterilised (pasteurised) material which has been homogenised at pressures up to 150 atm. is precooled to about 4 degrees centigrade above zero, stored in a cooling container for a definite time, preferably between 12 to 24 hours, and then cooled down to the region of the freezing point, i. e. to zero degrees Celsius, and mixed with carbonic acid at about 2 atm. pressure up to saturation, whereupon it is led under the same pressure slowly and without reduction of temperature to a second cooling container whose similarly highly compressed carbonic acid atmosphere is released into the mass as it flows thereto through the connecting conduit. When the material which has been thus transferred and considerably cooled has settled down in the second cooling container, which can be observed through a window or a partial construction of the container wall out of glass, by increasing the carbonic acid pressure existing on the surface by half an atmosphere, then the material is filled from the container into flasks filled with carbonic acid gas at the same high pressure, sealed and stored in suitable cool rooms. It lasts when treated in such manner for about 14 days without becoming viscous and it only froths after opening the seal of the bottle when poured into the glass, without previously spurting; waste of liquid and damage are thus avoided with certainty.

In the figures of the attached drawings is shown an example of a machine layout suitable for carrying out this process.

Fig. 2 shows a front view of the low temperature cooling container with built-on draw off apparatus for filling under counter-pressure.

Fig. 3 shows a front view on the further side of the low temperature cooling container.

Fig. 4 shows a front view of the rear side of the pre-cooling container and

Fig. 5 shows a front view from the driving side of the mixing arrangement of the pre-cooling container.

Figure 1:
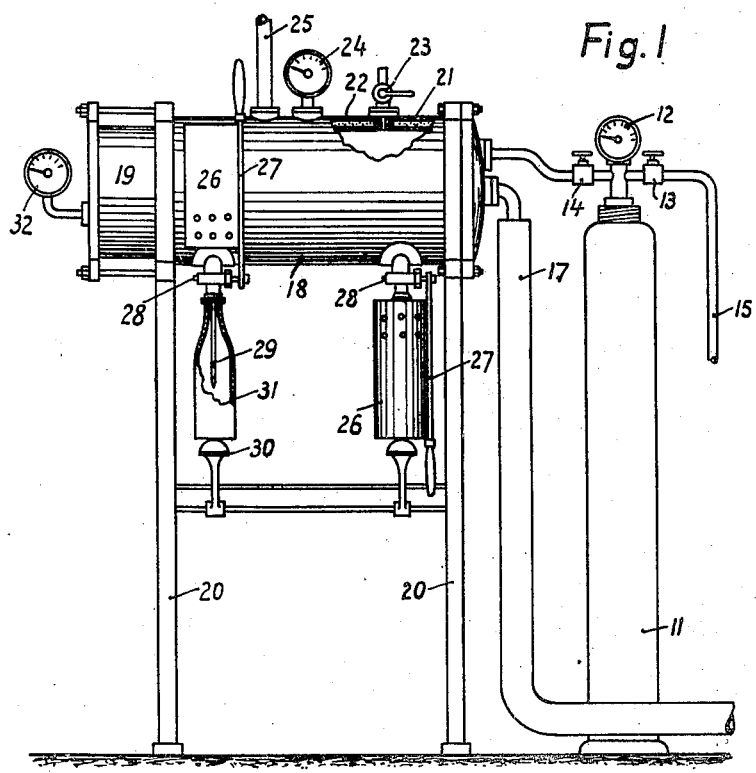
Fig. 1 shows in side view, with partial longitudinal section, the low temperature cooling container with the necessary connecting conduits and equipment.
Figure 1A:
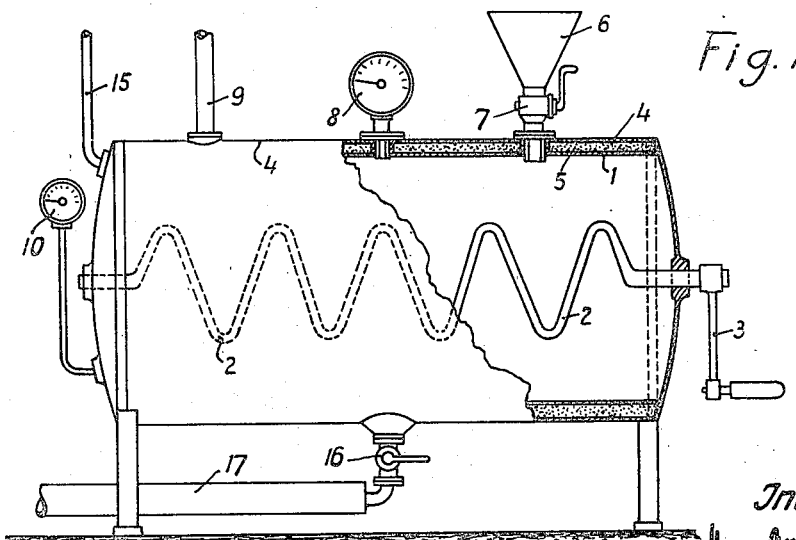
Fig. 1a is a view in elevation of the precooling container, partly broken away to show the construction.

In the various figures like parts are designated by like reference numerals. Referring to Fig. 1a, reference numeral 1 denotes the pre-cooling container, 2 is a mixing worm running therethrough operated by the hand crank 3 or a motor, 4 is a cooling jacket surrounding the wall of container 1 at a suitable spacing, 5 is the cooling brine which fills this space, 6 is the entry funnel for the material to be treated, 7 its regulating cock, 8 is a pressure gauge dial for the carbonic acid pressure, 9 is the brine inlet, 10 is a thermometer for the low temperatures. 11 is a cylinder of carbon dioxide, which is provided with pressure gauge 12 and reducing valves 13 and 14, 15 is the carbonic acid inlet pipe to the pre-cooler 1, 16 is a shut-off cock for the pre-cooled material to be treated, 17 is a transfer conduit between the containers 1 and 18 which is surrounded with heat insulating material, 18 is the low temperature cooling container, 19 is a continuation of container 18, constructed out of glass and closed by a metallic front plate, and held against the jacket 18, 20 is the supporting frame for the containers 18 and 19, 21 is a jacket surrounding the container 18 at a definite spacing, 22 is the cooling brine filling the cylindrical space between the containers 18 and 21 which is introduced through 25, 23 is a de-gassing valve, 24 is a pressure indicator, 26 denotes half-cylindrical protective cages for the bottles 31 which are movable about the swivels 28. 29 designates the filling member for the bottles 31. 30 denotes supports for the bases of the bottles which are rotatable round the axis 33 and held in the working position by the spring 34, and 27 is a valve lever for controlling the swivel 28.

After the milk which has been sterilised and homogenised at 150 atm. pressure, and to which may be added flavourings, syrups, sweeting agents, etc., has been run into the container 1 in a quantity regulated by the position of the stopcock 7 it remains therein for a period of 12 to 24 hours at rest until it is completely and uniformly cooled to 4 degrees centigrade above zero. Then the temperature in the container 1 is reduced to 0 degrees centigrade by a suitable circulation of brine, and carbonic acid at 2 atm. pressure is introduced into the container 1 through 15 by means of 11 and 13, whereon the stirring mechanisms 2 and 3 are operated until the liquid is fully saturated with carbonic acid. Carbonic acid at 2 atm. pressure is now led by a pipe from 11 through 14, with cock 23 opened, into the container 18 which has been cooled to zero degrees centigrade, until all atmospheric air has been displaced therefrom and there exists in it an atmosphere consisting entirely of carbonic acid which is maintained at 2 atm. pressure after closing the cock 23.

By opening the cocks 16 and 23 the low temperature cooled milk is now transferred through 17 into the tank 18, which is likewise pre-cooled to zero degrees centigrade, on the one hand whilst on the other hand at the same time and quite slowly and continuously by suitable placing of the degassing cock 23 the quantity of gaseous carbonic acid corresponding to the quantity of the added liquid is allowed to escape.

When the containers 18 and 19 are sufficiently full at 2 atm. pressure the cock 23 is closed and by increasing the pressure of carbonic acid on the liquid surface by ½ atm. the beverage subsides and this can be observed through 19. Then drawing off under counter-pressure begins in known manner by resting the bottle on 30 with the handle 27 and the protecting cage 26 in the raised position, whereby the carbonic acid entering the bottle displaces the air-content of the bottle. In a neighbouring bottle the transfer of the impregnated liquid from 18 and 19 takes place meanwhile, when the handle 27 and cage 26 are lowered, under the counter-pressure of the carbonic acid previously introduced into the empty bottle, until the bottle volume is completely filled while the superfluous quantity of gas escapes. The so filled bottle is now closed and kept cool.

I claim:

The process of manufacturing and bottling carbonated, milk beverages, which comprises, cooling a homogenized milk beverage, in a cooling container, to a temperature of about 4° C., maintaining the beverage at this temperature for a period ranging from about 12 to 24 hours, cooling the beverage to a temperature approaching 0° C., impregnating the beverage with carbon dioxide under pressure of about 2 atm., until the beverage is fully saturated with the carbon dioxide, conditioning a distributing tank to receive the treated beverage, by evacuating air from the tank by supplying carbon dioxide thereto, so that the tank is entirely filled with carbon dioxide at a pressure of about 2 atm., and by cooling the tank to a temperature approaching 0° C., transferring the beverage from the cooling container to the tank while maintaining the pressure and temperature in the container and the tank constant during the transfer, the beverage transferred to the tank displacing an equivalent volume of carbon dioxide from the tank so that the tank is completely filled with the volume of the beverage in the lower part of the tank and the residue volume of the carbon dioxide, in the upper part of the tank, introducing additional carbon dioxide into the volume of carbon dioxide in the tank, to increase the pressure by one-half atm., thereby causing the beverage to settle in the tank, eliminating frothing of the beverage, and discharging from the tank the beverage from below the volume of carbon dioxide, into retailing bottles, thereby causing the beverage to fill the bottles.

HANS GRIESBECK.